Patented Aug. 19, 1930

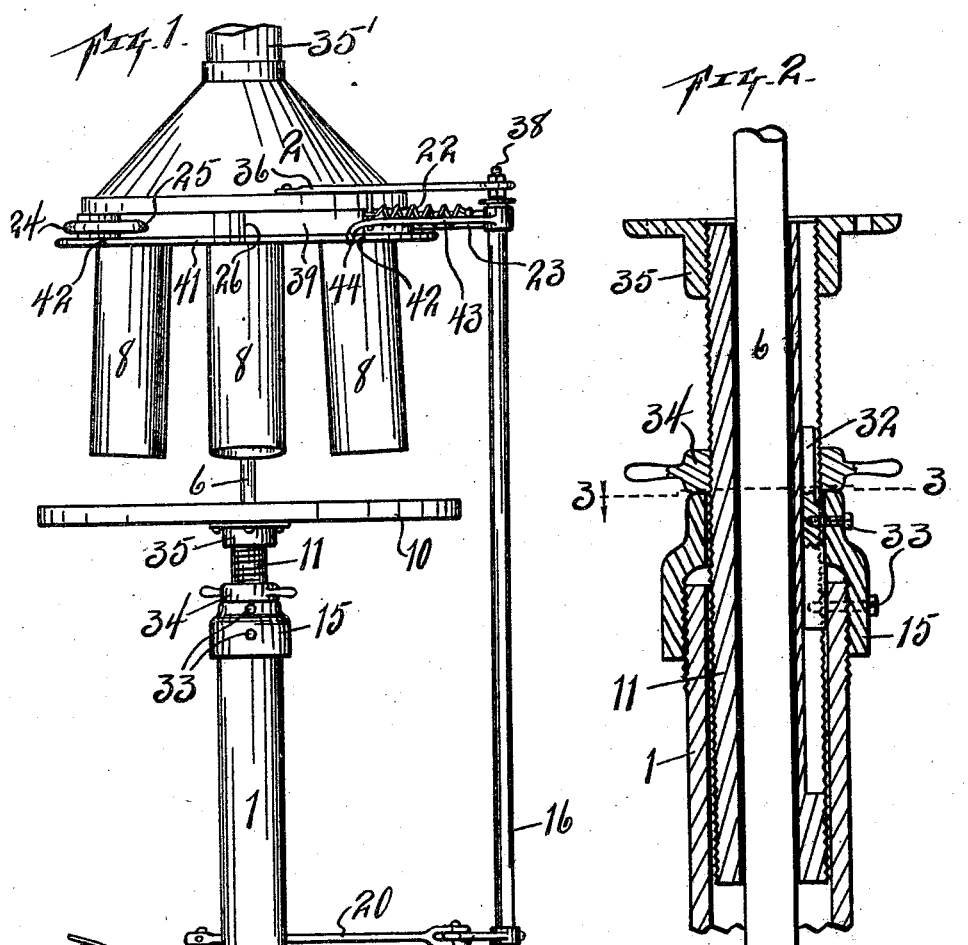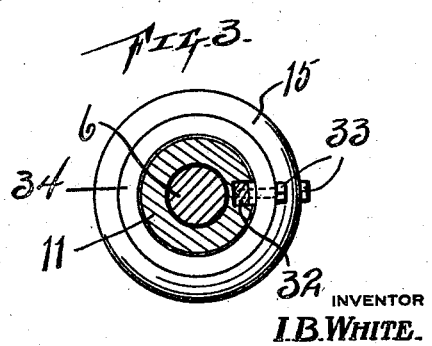

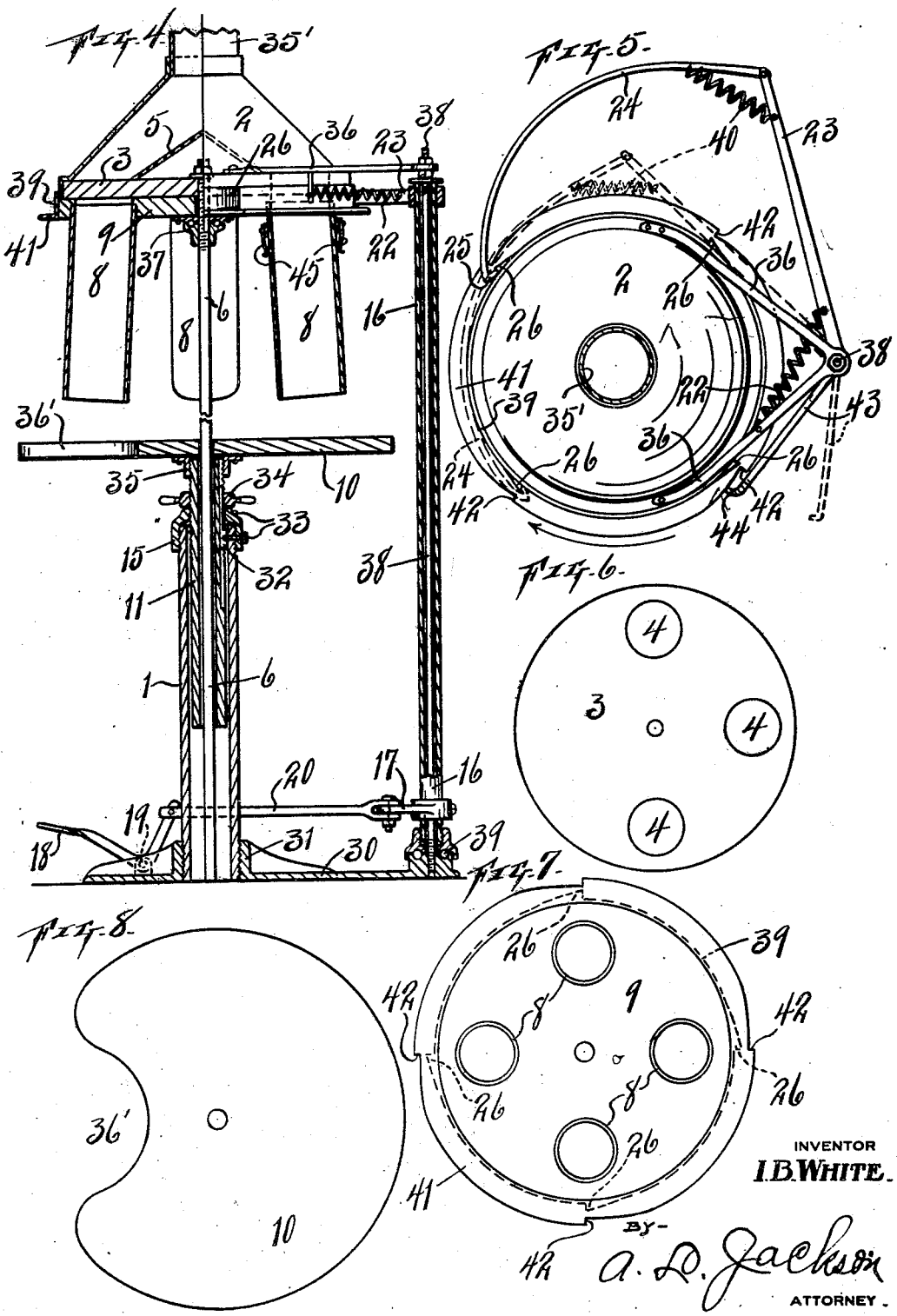

1,773,657

UNITED STATES PATENT OFFICE

IRA B. WHITE, OF FORT WORTH, TEXAS

BAG FILLER

Application filed September 23, 1929. Serial No. 394,547.

My invention relates to bag filling devices and more particularly to devices for filling packages with material in uniform quantities; and the object is to provide filling devices which are simple in construction and highly efficient in operation and which will feed material in uniform quantities and which can be manufactured and installed at small cost and which are economical because the packages or bags can be filled with rapidity and accuracy without waste and which are easily operated. The filling devices are useful in handling such material as mixed animal and poultry food and other material of similar character. Other objects and advantages will be fully explained in the following description and the invention will be more particularly pointed out in the claims.

Reference is had to the accompanying drawings which form a part of this application.

Fig. 1 is a side elevation of the machine.

Fig. 2 is a broken vertical section of the vertically adjusting devices.

Fig. 3 is a horizontal section, taken substantially on the line 3—3 of Fig. 2.

Fig. 4 is a vertical section of all the machine except at the upper part, the distributing devices are shown one half in section and the other half in full view.

Fig. 5 is a plan view.

Fig. 6 is a plan view of the distributing plate.

Fig. 7 is an inverted plan view of the bag holding plate.

Fig. 8 is a plan view of the bag supporting plate.

Similar characters of reference are used to indicate the same parts throughout the several views.

The bag filler is mounted by means of an upright hollow pedestal which serves as a support and guide for the non-rotatable shaft 6. The shaft 6 may be made rigid with the base 30. A socket 31 is mounted on the base 30 and made rigid therewith. A guide member 1 is screwed partly in the socket 31 and a reducing collar and bearing 15 is screwed on the upper end of the guide 1. An adjustable platform support 11 is non-rotatably mounted in and supported by the collar 15. The support 11 is prevented from rotating by a key 32 which is mounted in a vertical slot in the guide 11. The collar 15 is made non-rotatable by a screw 33 which is projected through the collar 15 into the key 33. A screw 33 may also be projected through the collar 15 and the support 1 as shown in Figs. 2, 3, and 4. The support 11 is moved vertically by a nut 34 which is for convenience provided with handles for turning the screw. The bag supporting platform 10 is made rigid with the support 11 by a flanged collar 35 which is bolted to the platform 10. The collar 35 is screwed on the support 11. The platform 10 can be elevated by turning the screw 34 and lowered by turning the screw 34 in the opposite direction. The platform 10 has a cut-out 36' for mounting the bags on the holders 8 and for removing the bags when filled. The platform 10 can be brought closer to or further from the bag carriers 8. The devices 8 carry the bags and also serve as means for directing the material into the bags.

Means are provided for feeding material into the machine. A pipe 35' leads from a supply source into a distributing hopper 2 which is stationarily mounted. This hopper has openings 4 in the bottom for escape of the food material. A cone-shaped divider 5 directs the material to the openings 4. Arms 36 are attached to the hopper 2 and supported on the rod 38 which is stationary. The shaft 6 is stationary and a ball bearing race 37, one part being rigid with the shaft and the other part rigid with the carrier 9. The carrier 9 thus rotates on ball bearings.

Means are provided for rotating the carrier 9. An arm 23 is rigid with a sleeve 16 which surrounds the rod 38. The sleeve 16 is provided with ball bearings 39. A flanged ring 39 is attached to the carrier 9. Lugs 26 are mounted on the body of the ring 39. A dog 24 is pivotally connected to the arm 23 and this dog is provided with hooks 25 which are adapted to engage the lugs 26 for actuating or rotating the carrier 9. A bell crank lever 18 is fulcrumed on the platform 30 by means of a bearing 19. This lever 18 is pivotally connected to a link bar 20 which is pivotally connected to a crank 17 which is rigid with the sleeve 16. The pivotal connection of 17 and 20 permit horizontal swinging motion. A spring 40 causes the dog 24 to bear against the periphery of the carrier 9. The effect of this is to make the dog 24 engage the lugs 26. A pressure of the foot on lever 18 will rotate the sleeve 16 by means of link bar 20 and lever 17. When the pressure of the foot is removed the dog 24 will be pushed along on the periphery of the carrier 9 by the spring 22 and arm 23, so that the dog (by means of hook 25) will engage a lug 26. The dog 24 and arm 23 will be brought to the dotted outline position shown in Fig. 5. The dog 24 will slide on the periphery of the carrier 9. Pressure is put on the lever 18 to move or rotate the carrier 9 and all the bags one-quarter turn. At the end of the quarter turn the carrier 9 will be locked stationary. The flange 41 has notches 42 in its periphery. An arm 43 is rigid with sleeve or shaft 16 and this arm has a hook 44 which catches in a notch 42. In this manner the carrier 9 is held stationary temporarily. When pressure is relieved from the lever 18, arm 43 will be brought by the spring 22 to dotted outline position.

In operation, the bags are clamped on the holders 8 (by clamps 45 if necessary). The bags are telescoped on the holders and the bottoms of the bags rest on the platform 10 and slide around thereon. Each bag will be partly filled when the bag registers with the first opening 4 in feed plate 3, then further filled as the bag registers with the next opening 4. Then if the bag is not filled by this time, it will be completely filled when it registers with the third opening 4. The bag then is moved on to be removed through the cut-out 36'. The carrier plate 9 is easily moved manually by reason of the ball bearings 37. But the carrier is positively moved by the lever 18 and the dog 24 with their connections. After each rotation a quarter turn by the lever 18, shaft 16, and arm 23, the dog 24 is brought back to dotted outline position automatically by the spring 22 pulling on arm 23.

What I claim, is,—

1. A bag filling apparatus comprising an upright non-rotatable shaft, a vertically adjustable platform moving on said shaft for supporting bags, a rotatable bag carrier rotating about said shaft and provided with a plurality of feed openings, bag supports attached to said carrier and registering with said openings, a feed hopper provided with a base having openings for feeding material through the openings in said bag carrier, and means for rotating said carrier to cause the openings therein to register with the openings in said base.

2. A bag filling apparatus comprising a stationary hopper provided with a base having openings therethrough, an upright shaft provided with a base rigid therewith and projecting through the base of said hopper, a bag carrier provided with a plurality of openings adapted to register with the openings in said hopper base and bag supports attached thereto about said openings, a stationary platform for supporting a plurality of bags and provided with a cut-out for the passage of bags, and means for rotating said bag carrier to cause the openings therethrough to register with the openings in said hopper base.

3. A bag filling apparatus comprising a stationary hopper provided with a base having openings therethrough, a divider for directing material to said openings, a non-rotatable shaft provided with a rigid base and projected through said hopper base, a bag carrier rotatably mounted on said shaft in close proximity to said hopper base and provided with openings adapted to register with the openings in said hopper base, tubular bag supports attached to said carrier about said openings and registering with said openings, a bag supporting platform provided with a cut-out for passage of bags, and means for vertical adjustment of said platform, and means for actuating said bag carrier.

4. A bag filling apparatus comprising a stationary hopper provided with a base having feed openings, a divider for directing feed material to said openings, a bag carrier rotatably mounted in close proximity to said hopper base and provided with openings adapted to register with the openings in said hopper base, tubular bag supports attached to said carrier about said openings, a platform for supporting bags having a cut-out for the passage of bags, means for vertically adjusting said platform, means for rotating said carrier step by step, and means for automatically returning said rotating means to starting position.

5. A bag filling apparatus comprising a hopper provided with a base having feed openings, a bag supporting platform, means for vertical adjustment of said platform, a rotating bag carrier provided with tubular bag supports and provided with openings adapted to register with the openings of said hopper base and to discharge material through said tubular supports, said carrier rotating in close proximity to said hopper base, means for positioning said carrier to cause the openings therein to register with the openings in said hopper base step by step, and means for automatically bringing said positioning means back to starting position after each step movement.

6. A bag filling apparatus comprising a hopper provided with a base having feed openings, a bag carrier rotating in close proximity to said hopper bottom and provided with openings adapted to register with said hopper bottom openings, tubular bag supports attached to said carrier about said openings for receiving material therefrom, a bag supporting platform and means for vertically adjusting said platform relative to said tubular supports, means for positioning said carrier relative to said hopper bottom to cause the carrier openings to register with the hopper bottom openings in succession, and means for locking said carrier temporarily stationary at each step movement.

In testimony whereof, I set my hand, this 20th day of September, 1929.

IRA B. WHITE.